United States Patent [19]

Goldsmith et al.

[11] 4,049,405
[45] Sept. 20, 1977

[54] FILTER MATERIAL CHARGING APPARATUS FOR FILTER ASSEMBLY FOR RADIOACTIVE CONTAMINANTS

[75] Inventors: Jesse M. Goldsmith; Alex O'Nan, Jr., both of Louisville, Ky.

[73] Assignee: American Air Filter Company, Inc., Louisville, Ky.

[21] Appl. No.: 617,248

[22] Filed: Sept. 26, 1975

[51] Int. Cl.² .................................................. B01D 46/32
[52] U.S. Cl. ...................................... 55/479; 55/518; 55/DIG. 9; 302/22; 302/57; 222/193
[58] Field of Search .......................... 55/33, 428–431, 55/466, 474, 479, 512, DIG. 9, 518; 302/22, 52, 57; 222/193, 195; 210/189

[56] References Cited

U.S. PATENT DOCUMENTS

| | | | |
|---|---|---|---|
| 2,590,148 | 3/1952 | Berg | 210/189 |
| 2,814,531 | 11/1957 | Murray, Jr. | 302/22 |
| 2,855,364 | 10/1958 | Roberts | 210/189 |
| 2,911,036 | 11/1959 | Lazar et al. | 55/431 |
| 2,941,842 | 6/1960 | Wishaw | 302/52 |
| 3,258,173 | 6/1966 | Koranda | 55/466 |
| 3,289,396 | 12/1966 | Anderson | 55/466 |
| 3,619,011 | 11/1971 | Doble | 222/193 |
| 3,800,508 | 4/1974 | Zenz | 55/474 |
| 3,920,427 | 11/1975 | Lachnit | 55/479 |
| 3,925,046 | 12/1975 | Hickey et al. | 55/431 |

OTHER PUBLICATIONS

Filter for Purification of Air or Gases, published Apr. 2, 1970, and found in Staub-Reinhalt, Luft vol. 30 May 5, 1970.

Primary Examiner—Frank W. Lutter
Assistant Examiner—David L. Lacey

[57] ABSTRACT

Filter charging apparatus for filter assembly for removal of radioactive contaminants in a fluid stream, the filter assembly including a housing with at least one filter bed therein and the filter charging apparatus for adding filter material to the filter assembly includes a tank with an opening therein, the tank opening being disposed in flow communication with opposed first and second conduit means, the first conduit means being in flow communication with the filter assembly housing and the second conduit means being in flow communication with a blower means. Upon activation of the blower means, the blower means pneumatically conveys the filter material from the tank to the filter housing.

8 Claims, 4 Drawing Figures

FILTER MATERIAL CHARGING APPARATUS FOR FILTER ASSEMBLY FOR RADIOACTIVE CONTAMINANTS

BACKGROUND OF THE INVENTION

This invention relates to filters for removal of radioactive contaminants in a fluid stream and more particularly relates to a means for adding filter material to a filter assembly including at least one filter bed therein.

In recent years, there has been considerable activity in providing filtration equipment for nuclear power facilities. Most designs have included filter beds comprising charcoal filled stainless steel insert trays wherein bed replacement is accomplished by removing the contaminated trays and replacing them with new ones. The spent trays are then either disposed of or returned to the manufacturer where they are dismantled and reloaded. Because of the design of the trays, gaskets are generally required to seal each tray to the filter units. However, the gasket seals have proved to be leak sources thereby allowing the escape of radioactive material in a gas stream. Thus, integral beds permitting on site charcoal removal and reloading has been sought with little success.

SUMMARY OF THE INVENTION

In the present invention, it is recognized that it is desirable to provide means for adding adsorptive materials to a filter for radioactive contaminants and it is further recognized that it is desirable to provide means for adding adsorptive material to a filter for radioactive contaminants without removing the beds or chambers which holds the adsorptive material therein.

The present invention advantageously provides a straightforward arrangement of an apparatus for adding filter materials to a filter assembly for removal of radioactive contaminants. The present invention further provides a pneumatic conveying device for loading filter material into a filter assembly for removal of radioactive contaminants from a contaminated gas stream.

Various other features of the present invention will become obvious to those skilled in the art upon reading the disclosure set forth hereinafter.

More particularly, the present invention provides in combination a filter assembly for removal of radioactive contaminants in a fluid stream including a housing having a fluid inlet and outlet and at least one filter bed therein in fluid communication with the fluid inlet and outlet, the filter bed having spaced vertically extending foraminous sides and impervious ends for receiving adsorptive material therein, the upper portion of the spaced sides and ends defining an inlet for receiving the adsorptive material therein, an adsorptive material charging apparatus for adding adsorptive material to the housing comprising: a tank having a downwardly projecting lower portion terminating in an opening, the tank opening being in fluid communication with opposed first and second conduit means, the first conduit means being in flow communication with the housing and the second conduit coupling in fluid flow communication a blower means to the tank opening.

It is to be understood that the description of the examples of the present invention given hereinafter are not by way of limitation. Various modifications within the scope of the present invention will occur to those skilled in the art upon reading the disclosure set forth hereinafter.

Referring to the drawings.

Figure 1:
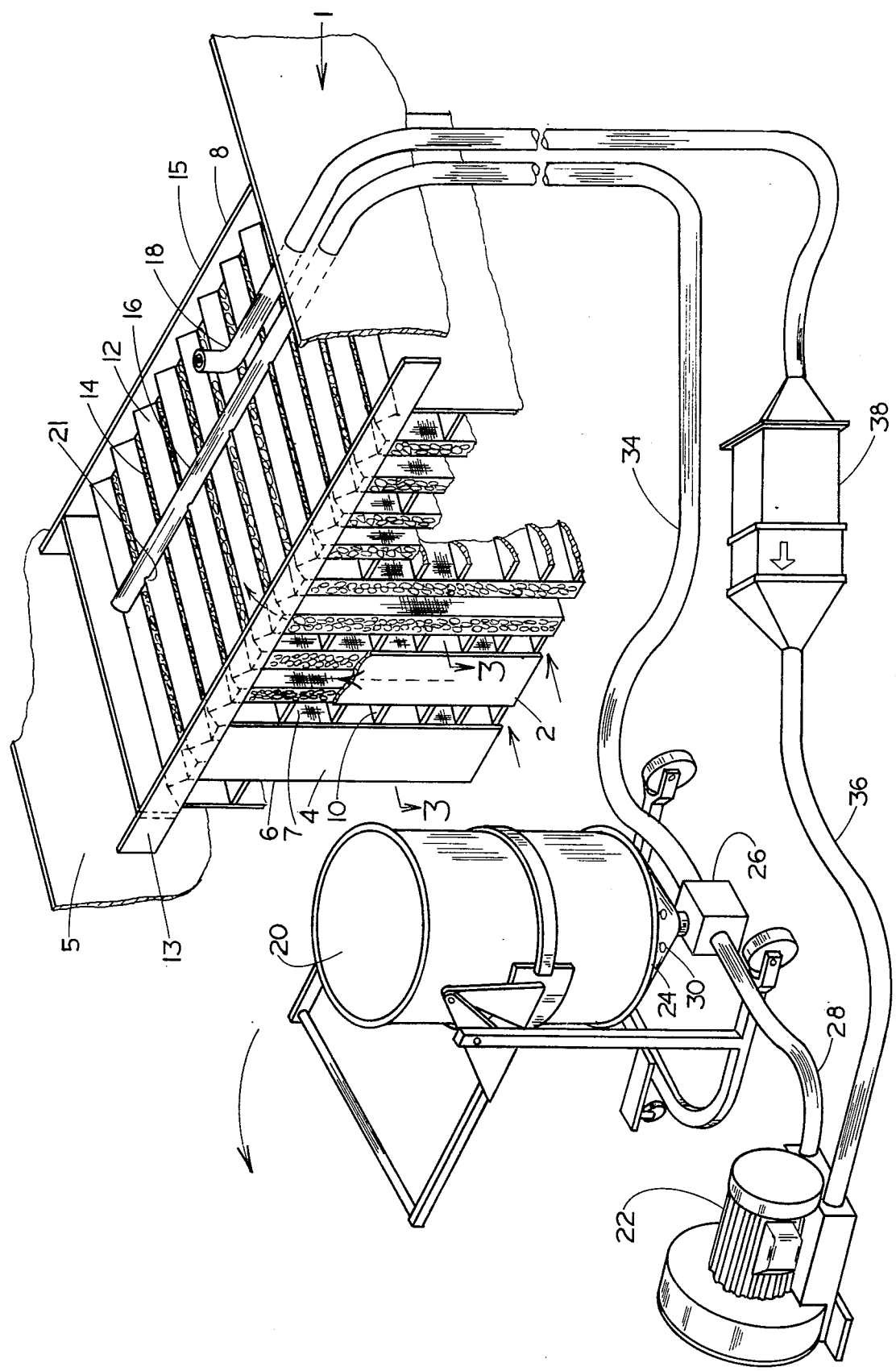
FIG. 1 is a perspective view, partially in cut-away, of a filter assembly including the filter material charging apparatus of the present invention.
Figure 3:
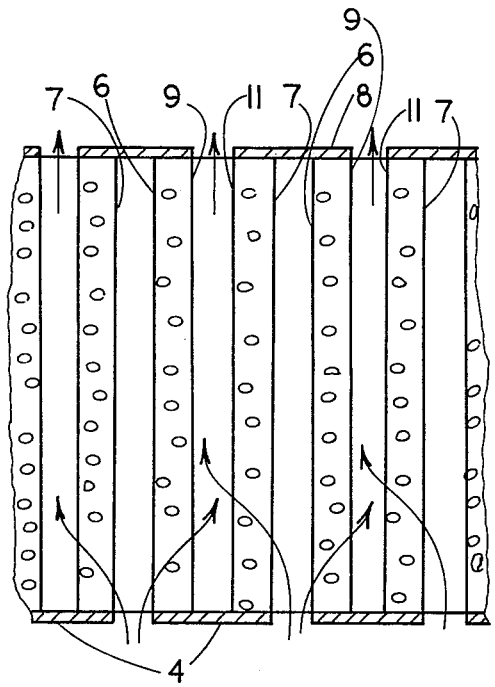
FIG. 3 is a plan view, partially in section, taken through line 3—3 of FIG. 1; and, FIG. 4 is an enlarged sectional view of another preferred pneumatic device withdrawing filter material from a feed container.

A filter assembly for removal of radioactive contaminants as shown in FIGS. 1 and 3 includes a housing 1 with a plurality of filter beds 2 therein, each filter bed 2 including an impervious front plate member 4 and spaced foraminous side members 6 and 7 with intermediate spaced foraminous side members 9 and 11 disposed between side members 6 and 7. The filter beds 2 extend rearwardly and each bed 2 is attached to a pair of impervious back plate members 8 along the rear edges of side members 9 and 11, spacing between adjacent side members 9 and 11 defining outlet passages for clean gas leaving the filter assembly. The plate members 8 transverse the back of the housing 1, extending vertically from the floor of the housing to a preselected distance above the beds. Gases which pass through the filter enter the housing between the spaced foraminous side members 6 and 7 then out the back of the filter bed 2 through the outlet defined by the opening between foraminous sides 9 and 11. Disposed between the filter beds 2 are a plurality of rectangularly shaped horizontally extending plate members 10. The plate members 10 are parallel spaced in a vertical position to provide a plurality of channels between the filter beds 2 whereby contaminated gases pass through the defined channels prior to entering the filter beds 2 as mentioned above.

Longitudinally extending baffle members 12 of inverted V-shape cross-sectional configuration are provided across the top of the filter beds 2. The baffle members 12 being connected to the upper extremities of the side members 6, 7, 9 and 11 and transversely extending opposed end members 13 and 15. The opposed edges of adjacent baffle member 12 define opening 14 in the form of longitudinally extending slots between foraminous walls 6 and 9, and 7 and 11, respectively. The opening defined by the edge of the adjacent baffle members 12 define the openings or slots to receive carbon or other filter materials therein.

Disposed above the top of the filter beds 2 and the top of the housing 1 is a plenum 5, plenum 5 including a pair of transversely extending conduits 16 and 18. Conduit 16 is in flow through communication with a feed tank 20 whereby filter materials contained in feed tank 20 are conveyed pneumatically from the tank 20 to the filter beds 2 by way of the conduit 16. Conduit 16 is provided with a plurality of apertures 21 therein, each aperture being in alignment with the apex of baffles 12 whereby the filter material, usually in granular form, is transferred from the feed tank 20 to the filter beds 2, the granules descending over the baffles 12 and into the filter bed 2 through the openings defined by the edges of adjacent baffles 12. The conduit 16 is generally spaced a preselected distance above the filter beds 2 wherein overfilling of the filter beds 2 up to the aperture 21 in the conduit 16 provides a seal of the opening defined by the adjacent baffles 12 so that all of the contaminated gases pass through the filter material. It has also been found that the baffles 12 may be flat with filter material building up thereon before spilling over into the openings defined by the edges of adjacent baffle members 12. However, in using the inverted V-shaped baffles as shown in FIG. 1, by preselecting the distance between the conduit 16 and the beds 2, excessive use of filter material can be prevented while still insuring enough filter material in the bed to provide for adequate filtration of contaminated gases. Also, there is very little danger of the filter material piling on the top of the baffles 12 which are inclined at an angle to the horizontal of at least 30°.

In the pneumatic conveying means a blower 22 is provided to maintain an airstream which sweeps the particulate material from the bottom of the feed tank 20 conveying same to the top of the filter beds 2. The feed tank 20 includes a funnel-shaped downwardly projecting lower portion or hopper 24 which funnels the particulate matter out of the tank 20 into a rectangular shaped well 26 which is on the downstream side of the blower 22 and coupled thereto by means of conduit 28.

The feed tank 20, as shown, is a drum which has previously been filled with the filter material to be added to the filter housing, the drum having a closed bottom and an open top and turned upside down whereby the opening in the drum is in mating relation with the opening in the top of the funnel 24.

The funnel 24 may be integral with the drum or tank 20 or it may be separate therefrom. The funnel 24 generally has a plurality of apertures 30 therein which are generally smaller than the particulate material contained in the funnel 24. The apertures 30 are provided as vents to prevent negative pressure build up in the funnel or hopper 24 and also to provide a pressure relief in case of plugs in the discharge conduits and pressure build up from the blower 22.

Figure 2:
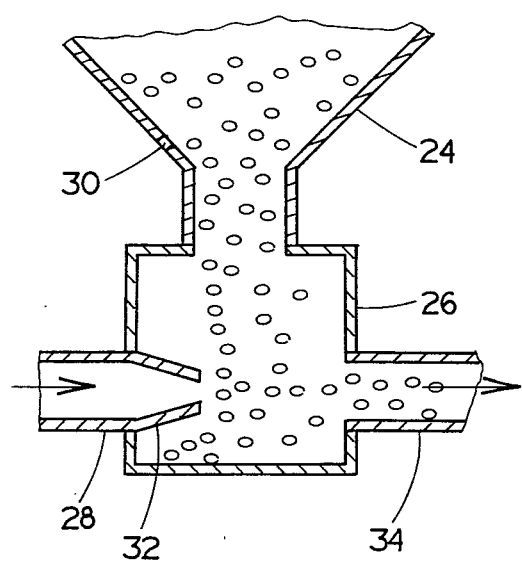
FIG. 2 is an enlarged sectional view of a pneumatic device withdrawing filter material from the feed container in FIG. 1.

As shown in FIG. 2, conduit 28 terminates in an eductor 32 which is venturi-like and necked at the end to provide an increase in velocity of the flow of the conveying air to a rectangular shaped receiving chamber 26 thereby decreasing the pressure at the chamber 26, sweeping the filter material into the exiting conduit 34 which is in fluid communication with conduit 16.

Figure 4:
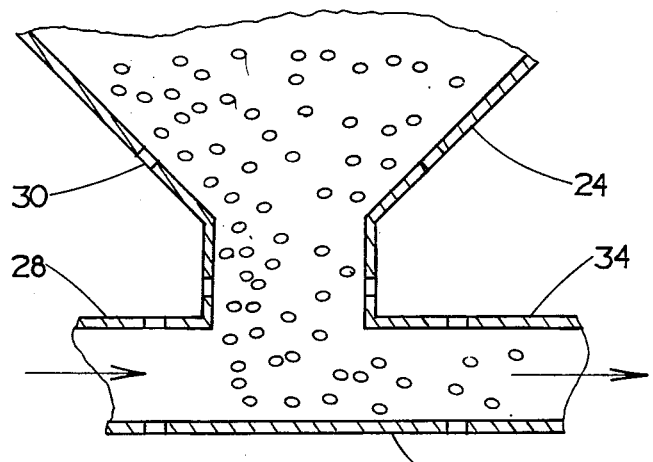

As shown in FIG. 4, conduit 28 is coupled to one end of a T-shaped conduit 31 with the other ends being flow connected to the bottom opening of hopper 24 and conduit 34, conduit 34 being connected to the end of the T-shaped conduit 31 opposing the end connected to the conduit 28. In this embodiment, velocity of air flowing beneath the hopper 24 is not substantially changed in sweeping the filter material into the exiting conduit 34.

The upstream side of the blower 22 is coupled to re-cycle air from the top of the housing 1. Conduit 36 is provided between and in fluid communication with the blower 22 and a high efficiency particulate filter 38. The conduit 18 is provided between and in fluid communication with the high efficiency particulate filter 38 and the top of the housing 1. Thus, the conveying air is recycled from the top of the housing 1 by means of conduits 18 and 36 through filter 38. The high efficiency particulate filter 38 disposed upstream of the blower 22 filters out the dust and fine particles picked up from the top of the housing 1 during the re-cycle of the conveying air.

In the charging of the filter beds 2, a drum of particulate filter material, such as charcoal or an impregnated charcoal, is disposed above and in fluid tight communication with the funnel or hopper 24. The blower 22 is then activated and the particulate material from the tank 20 which is fed by gravity into the rectangularly shaped chamber 26 is swept into the air stream passing through the eductor 32, the particulate material being conveyed to the top of the housing 1 and out of the conduit 16 through apertures 22 into the appropriate filter beds 2 disposed therebeneath. The suction side of the blower 22 is also in communication with the top of the housing through conduit 18, re-cycling the air from the top of the unit, bringing dust laden air into communication with the high efficiency particulate filter 38 where the dust particles are removed therefrom. The cleaned air from the high efficiency particulate filter 38 is then returned to the blower 22 for conveying more particulate material in the feed tank 20 to the top of the housing 1.

It will be realized that various changes may be made to the specific embodiment shown and described without departing from the scope and spirit of the present invention.

What is claimed is:

1. In combination a filter assembly for removal of radioactive contaminants in a gas stream including a housing having a fluid inlet and outlet and at least one filter bed being provided with adsorptive filter material therein in fluid communication with the fluid inlet and outlet, said at least one filter bed having spaced vertically extending foraminous sides and impervious ends for receiving adsorptive material therein, the upper portion of the spaced sides and ends defining an inlet for receiving said adsorptive material therein, an adsorptive charging apparatus for adding said adsorptive material to said housing comprising: a tank having a downwardly projecting lower portion terminating in an opening, said tank opening being in fluid communication with opposed first and second conduit means, said first conduit means being in flow communication with said inlet for receiving said adsorptive material therein, and said second conduit means coupling in fluid flow communication with a blower means to the tank opening, said first conduit means being spaced above said at least one filter bed a preselected distance, said first conduit means having one aperture therein disposed above said at least one filter bed, said at least one filter bed having baffle members along the top thereof, said baffle members being of inverted V-shaped cross section and positioned at an angle to horizontal of at least 30°, the apex of said baffle members being spaced from and aligned with the aperture in said first conduit means, the edges of said baffle members being aligned with the upper extreme edge of said foraminous sides, the edges of adjacent baffle members defining openings therein to receive filter material therethrough.

2. The apparatus of claim 1 including a third conduit means disposed between and coupling in fluid flow communication said housing and said blower means.

3. The apparatus of claim 2, said third conduit means including a filter element therein.

4. The apparatus of claim 3 wherein said filter element is a high efficiency particulate air filter.

5. The apparatus of claim 1, said downwardly projecting lower portion of said tank being in flow communication with a chamber of rectangular shaped cross section, said first and second conduit means being in flow communication with said chamber.

6. The apparatus of claim 1, said downwardly projecting lower portion of said tank being in flow communication with a T-shaped conduit, said first and second conduit means being in flow communication with opposed ends of said T-shaped conduit.

7. The apparatus of claim 1, the lower portion of said tank being funnel-shaped.

8. The apparatus of claim 1, said tank having apertures in the sides thereof, said apertures being generally smaller than the filter material.

* * * * *